US012265503B2

(12) United States Patent
Shankar et al.

(10) Patent No.: US 12,265,503 B2
(45) Date of Patent: Apr. 1, 2025

(54) ADAPTIVE DEDUPLICATION OF DATA CHUNKS

(71) Applicant: Cohesity, Inc., San Jose, CA (US)

(72) Inventors: Aiswarya Bhavani Shankar, San Jose, CA (US); Dane Van Dyck, Atlanta, GA (US); Venkata Ranga Radhanikanth Guturi, San Jose, CA (US); Leo Prasath Arulraj, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/183,659

(22) Filed: Mar. 14, 2023

(65) Prior Publication Data

US 2024/0311342 A1    Sep. 19, 2024

(51) Int. Cl.
*G06F 16/17* (2019.01)
*G06F 11/14* (2006.01)
*G06F 16/174* (2019.01)

(52) U.S. Cl.
CPC ...... *G06F 16/1752* (2019.01); *G06F 11/1453* (2013.01); *G06F 2201/84* (2013.01)

(58) Field of Classification Search
CPC ............. G06F 16/1752; G06F 16/1453; G06F 2201/84
See application file for complete search history.

(56) References Cited

U.S. PATENT DOCUMENTS

| | | |
|---|---|---|
| 7,293,027 B2 | 11/2007 | Margolus |
| 7,590,807 B2 | 9/2009 | McGovern et al. |
| 9,166,989 B2 | 10/2015 | Huang et al. |
| 9,323,760 B1 | 4/2016 | Chopra et al. |
| 10,140,303 B1 | 11/2018 | Patterson |
| 10,228,958 B1 | 3/2019 | Rustad et al. |
| 10,235,417 B1 | 3/2019 | Sterin et al. |
| 10,528,521 B2 | 1/2020 | Agarwal et al. |
| 11,086,545 B1 | 8/2021 | Dayal et al. |
| 11,748,299 B2 | 9/2023 | Yarlagadda et al. |
| 2005/0055519 A1 | 3/2005 | Stuart et al. |

(Continued)

OTHER PUBLICATIONS

Simha et al., "A Scalable Deduplication and Garbage Collection Engine for Incremental Backup", Association for Computing Machinery, Jun. 30, 2013, 12 pp.

(Continued)

*Primary Examiner* — Hares Jami
(74) *Attorney, Agent, or Firm* — Shumaker & Sieffert, P.A.

(57) ABSTRACT

Techniques are described for selectively extending a WORM lock expiration time for a chunkfile. An example method comprises identifying, by a data platform implemented by a computing system, a chunkfile that includes a chunk that matches data for an object of a file system; determining, by the data platform after identifying the chunkfile, whether to deduplicate the data for the object of the file system by adding a reference to the matching chunk, wherein determining whether to deduplicate the data comprises applying a policy to at least one of a property of the chunkfile or properties of one or more of a plurality of chunks included in the chunkfile; and in response to determining to not deduplicate the data for the object of the file system, causing a new chunk for the data for the object of the file system to be stored in a different, second chunkfile.

20 Claims, 8 Drawing Sheets

(56) References Cited

U.S. PATENT DOCUMENTS

| | | |
|---|---|---|
| 2005/0138640 A1 | 6/2005 | Fresko |
| 2005/0257400 A1 | 11/2005 | Sommerer et al. |
| 2006/0143251 A1 | 6/2006 | Peterson et al. |
| 2008/0263108 A1 | 10/2008 | Herbst et al. |
| 2010/0036872 A1 | 2/2010 | Hiraiwa et al. |
| 2011/0238935 A1 | 9/2011 | Meehan |
| 2012/0117029 A1 | 5/2012 | Gold |
| 2013/0080395 A1 | 3/2013 | Gong |
| 2013/0159648 A1 | 6/2013 | Anglin et al. |
| 2015/0066873 A1* | 3/2015 | Voruganti ............ G06F 16/1748 707/692 |
| 2017/0169038 A1 | 6/2017 | Borate et al. |
| 2017/0212915 A1 | 7/2017 | Borate et al. |
| 2018/0267710 A1 | 9/2018 | Deshpande et al. |
| 2019/0340261 A1* | 11/2019 | Jain ..................... G06F 16/122 |
| 2020/0250083 A1 | 8/2020 | Shilane et al. |
| 2020/0410135 A1 | 12/2020 | Macey et al. |
| 2021/0042263 A1 | 2/2021 | Zdornov et al. |
| 2021/0072928 A1 | 3/2021 | Winarski |
| 2021/0124648 A1 | 4/2021 | Srinivasan et al. |
| 2021/0141698 A1 | 5/2021 | Bourgeois et al. |
| 2021/0294774 A1 | 9/2021 | Keller et al. |
| 2022/0066670 A1* | 3/2022 | Naik ..................... G06F 3/0641 |
| 2022/0083514 A1* | 3/2022 | Rath ................... G06F 11/1451 |
| 2022/0100652 A1 | 3/2022 | Liu et al. |
| 2022/0121529 A1 | 4/2022 | Rath et al. |
| 2022/0382652 A1 | 12/2022 | Yadav et al. |
| 2022/0413968 A1 | 12/2022 | Yeger et al. |
| 2023/0029616 A1 | 2/2023 | Pandit et al. |
| 2023/0032714 A1 | 2/2023 | Pandit et al. |
| 2023/0077938 A1 | 3/2023 | Yarlagadda et al. |
| 2023/0147671 A1* | 5/2023 | Narulkar ............ G06F 16/1748 707/692 |
| 2023/0244633 A1 | 8/2023 | Van Dyck et al. |
| 2023/0273897 A1 | 8/2023 | Van Dyck et al. |
| 2024/0103978 A1* | 3/2024 | Madan ................ G06F 16/1748 |

OTHER PUBLICATIONS

Bill Tolson, Cloud Archiving and Immutability; Azure offers WORM, Archive360.com, Sep. 20, 2018, https://www.archive360.com/blog/cloud-archiving-and-immutability-azu (10 pp).

Cohesity, "Architecture Matters Cohesity vs Dell EMC PowerScale (previously Dell EMC Isilon) NAS Scale-Out Limits", Cohesity, Sep. 2021, 11 pp., Retrieved from the Internet on Aug. 4, 2023 from URL: https://www.cohesity.com/resource-assets/white-paper/architecture-matters.pdf.

Cohesity, "Cohesity SpanFS and SnapTree", Cohesity, Sep. 2019, 11 pp., Retrieved from the Internet on Aug. 4, 2023 from URL: https://www.cohesity.com/resource-assets/white-paper/Cohesity-SpanFS-and-SnapTree-WP.pdf.

Ju-Lien Lim, Protecting Backup Archives with WORM and Tape Retention Lock, AWS Storage Blog, Aug. 19, 2020, https://aws.amazon.com/blogs/storage/protecting-archives-with-worm-an/ (7 pp).

VMware Customer Connect, "Cohesity Platform for Data Protection of VMware Cloud on AWS (80830)", Sep. 18, 2020, 10 pp., Retrieved from the Internet on Oct. 10, 2023 from URL: https://kb.vmware.com/s/article/80830#.

* cited by examiner

ADAPTIVE DEDUPLICATION OF DATA CHUNKS

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for selectively extending a write once, ready many (WORM) lock expiration time for a chunkfile of one or more data chunks ("chunks"). Data platforms may offer an archive function whereby a representation of at least a portion of the file system can be stored to a storage system for later retrieval. The representation (the "archive") may be used to subsequently restore the portion of the file system to its state at the time of the archive operation, or the representation may be used to create or present a new file system (or "view") based on the archive. A user may cause the data platform to store multiple archives in this way, with each archived at a different time and representing a state of the file system at that time. An archive may be subject to a data lock having a data lock period that is a minimum amount of time for which file system data associated with the archive should be locked to prevent modification or deletion.

Data platforms may deduplicate data where possible so as not store redundant copies of the data. Deduplication involves identifying redundant chunks of data, storing one copy of the redundant chunks, and replacing duplicate segments with a pointer or other reference to the stored copy. In a data platform, multiple different objects for storage may be deduplicated, i.e., may have respective data chunks that are replaced with a pointer or other reference to a single stored instance of the chunks. Objects of a file system may be included in different archives but have references to the same stored instance of a chunk, and each of the different archives may have different data lock expiration times. Because an object inherits the data lock of its archive, the various chunks within a chunkfile that are referenced by different objects having different data lock periods may have significantly different respective chunk expiration times. To implement data locks for archives, a chunkfile may be subject to WORM lock having a WORM lock expiration time. The WORM lock expiration time for a chunkfile may be extended where a new archive, subject to a data lock period, includes an object that references a chunk in the chunkfile. The WORM lock expiration time for a chunkfile may be set to greater than or equal to the latest of the chunk expiration times for its chunks. Once a WORM lock expiration time for a chunkfile is reached, the chunkfile may be garbage collected.

A data platform may apply a policy that determines whether to selectively extend a WORM lock expiration time for a chunkfile. The data platform may apply this policy when deciding whether to add a new reference to an existing chunk in the chunkfile. The policy may be conditioned on characteristics of the chunkfile. For example, the policy may specify that an expiration time for a chunkfile should only be extended if a maximum expiration time based on the original data lock period for the chunkfile has not been reached. As another example, the policy may be conditioned on characteristics, e.g., expiration times, of one or more individual chunks within the chunkfile. These and other policy examples are described in further detail below. If conditions for extending an expiration time for a chunkfile cannot be satisfied, the data platform may eschew extending the expiration time for the chunkfile and instead use a new chunkfile, with an appropriate WORM lock expiration time, to store a new instance of the chunk for the new reference being added. The chunk being considered for deduplication is therefore not being deduplicated in this circumstance because a new instance of the chunk is being stored. If conditions in policies support extending a WORM lock expiration time for the chunkfile, however, the data platform may extend the WORM lock expiration time for the chunkfile and create the new reference to the existing chunk in the chunkfile. In this way, the data platform performs adaptive deduplication of the chunks based on the policy.

The techniques may provide one or more technical advantages that realize a practical application. For example, the techniques may improve storage utilization by chunkfiles by reducing a number of superfluous chunks in the storage system, i.e., chunks that are not referenced by any archive but that are retained in a chunkfile because the chunkfile remains subject to a WORM lock. The policies provide a flexible and granular mechanism with which to specify whether to extend a WORM lock expiration time for a chunkfile using policies, allowing the data platform provider and/or user to create policies that best satisfy the sometimes competing goals of the provider/user, such as improving storage utilization, reducing the number of instances of new chunkfiles created (which can correlate to costs relating to uses of a storage system API), reducing the number of data locks, reducing the number of chunkfiles, and/or other goals.

Although the techniques described in this disclosure are primarily described with respect to an archive function of a data platform, similar techniques may be applied for a backup function or other similar function of the data platform involving deduplication.

In one example, this disclosure describes a method comprising identifying, by a data platform implemented by a computing system, a chunkfile that includes a chunk that matches data for an object of a file system; determining, by the data platform after identifying the chunkfile, whether to deduplicate the data for the object of the file system by adding a reference to the matching chunk, wherein determining whether to deduplicate the data comprises applying a policy to at least one of a property of the chunkfile or properties of one or more of a plurality of chunks included in the chunkfile; and in response to determining to not deduplicate the data for the object of the file system, causing a new chunk for the data for the object of the file system to be stored in a different, second chunkfile.

In another example, this disclosure describes a computer-readable storage medium comprising instructions that, when executed, configure processing circuitry of a computing system to: identify a chunkfile that includes a chunk that matches data for an object of a file system; determine whether to deduplicate the data for the object of the file system by adding a reference to the matching chunk, wherein determining whether to deduplicate the data comprises applying a policy to at least one of a property of the chunkfile or properties of one or more of a plurality of chunks included in the chunkfile; in response to determining to not deduplicate the data for the object of the file system, cause a new chunk for the data for the object of the file system to be stored in a different, second chunkfile; and in response to determining to deduplicate the data for the object of the file system, add the reference to the matching chunk.

In another example, this disclosure describes a computing system comprising: a storage device; and processing circuitry having access to the storage device and configured to: identify a chunkfile that includes a chunk that matches data for an object of a file system; determine, after identifying the chunkfile, whether to deduplicate the data for the object of the file system by adding a reference to the matching chunk, wherein determining whether to deduplicate the data comprises applying a policy to at least one of a property of the chunkfile or properties of one or more of a plurality of chunks included in the chunkfile; and in response to determining to not deduplicate the data for the object of the file system, cause a new chunk for the data for the object of the file system to be stored in a different, second chunkfile.

BRIEF DESCRIPTION OF THE DRAWINGS

Like reference characters denote like elements throughout the text and figures.

DETAILED DESCRIPTION

Figure 1A:
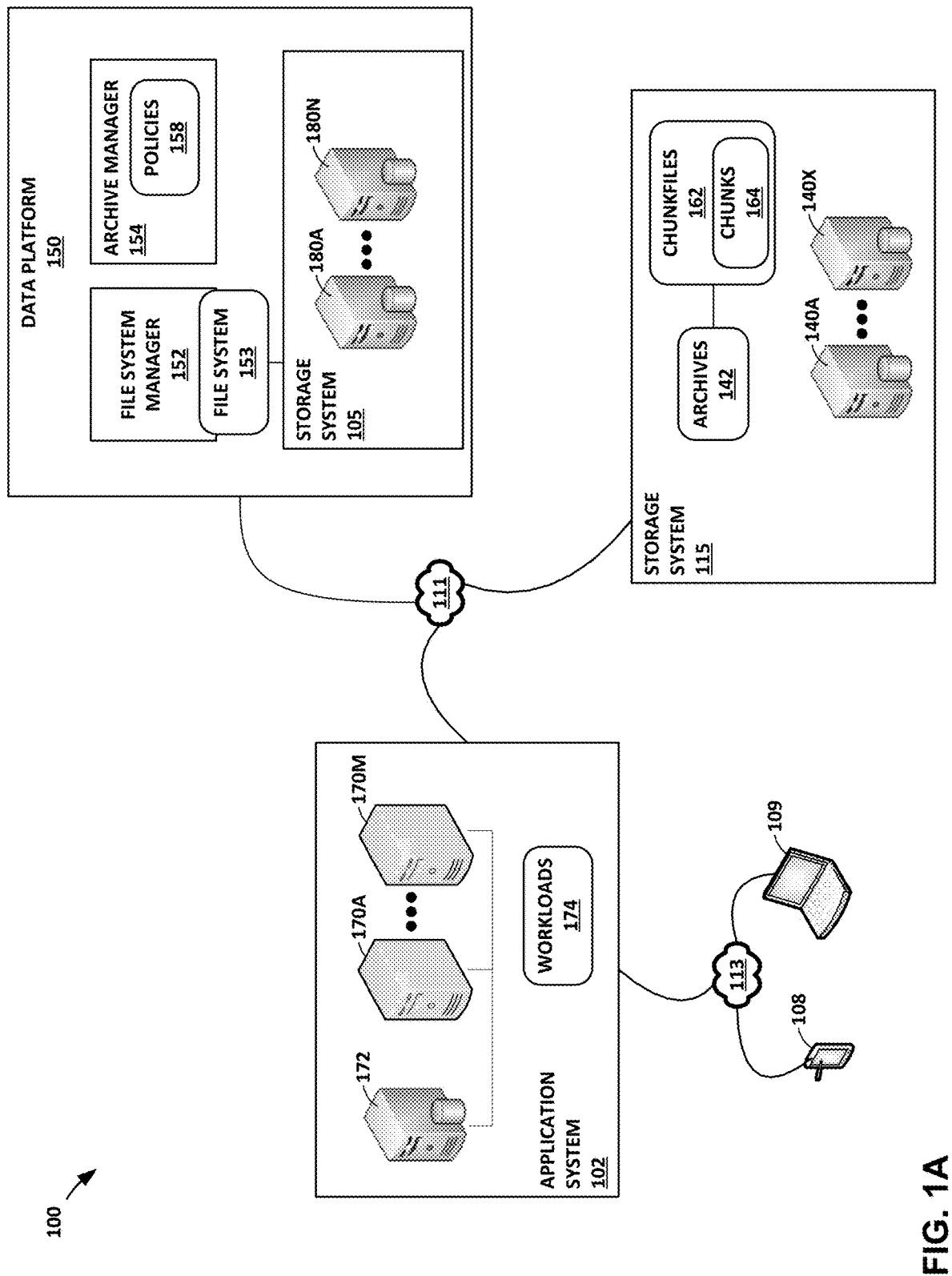
FIGS. 1A-1B are block diagrams illustrating example systems that perform adaptive deduplication of data chunks, in accordance with one or more aspects of the present disclosure.
Figure 1B:
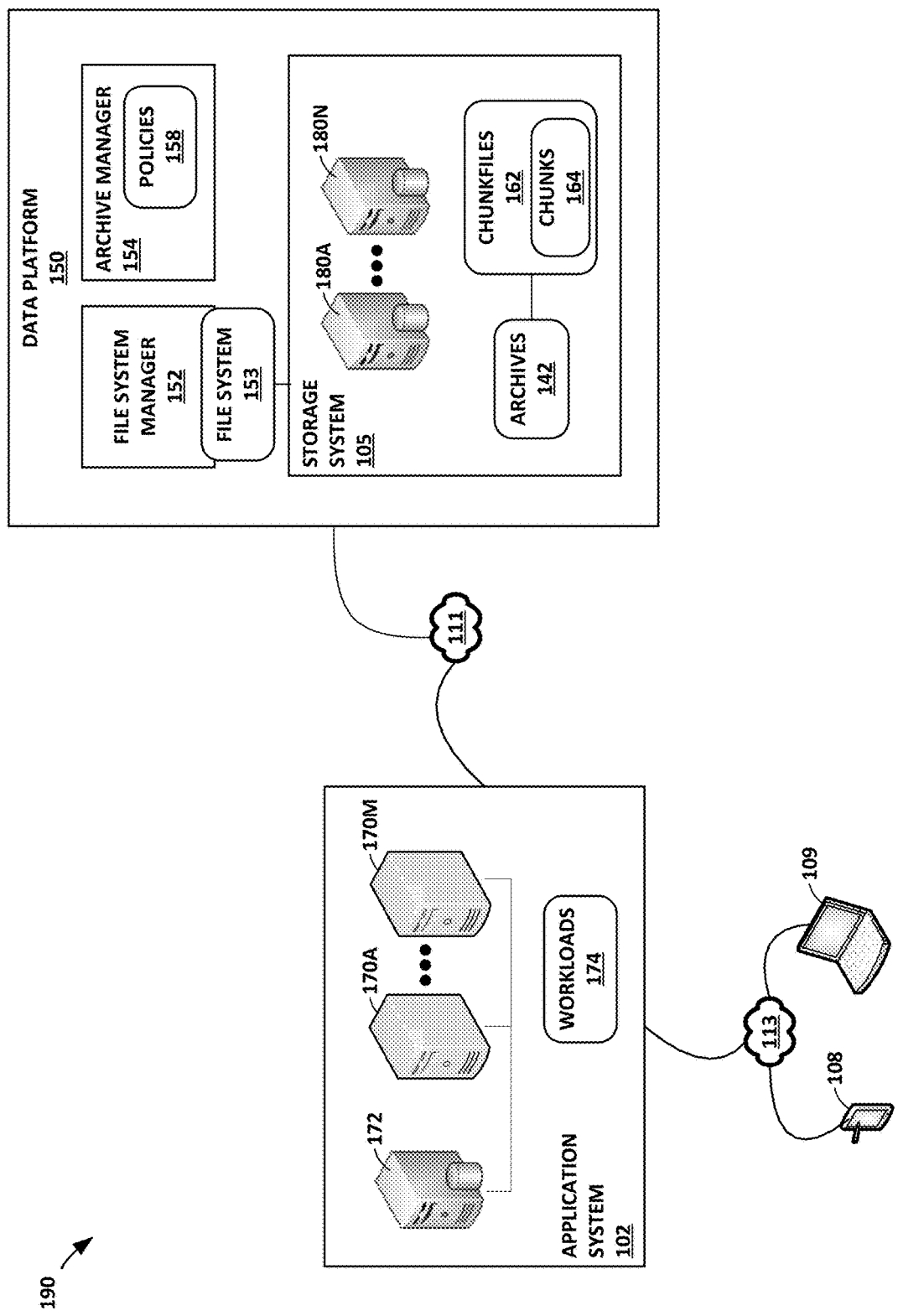

FIGS. 1A-1B are block diagrams illustrating example systems that perform adaptive deduplication of data chunks, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.) Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS, Platform-aaS, Infrastructure-aaS, Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and archive manager 154 in the example of system 100, and store objects and metadata for data platform 150 to storage media. In some examples, separate compute devices (not shown) execute software for data platform 150, such as file system manager 152 and archive manager 154 in the example of system 100. Each of storage devices 180 may be considered and referred to as a "storage node" or simply as "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Archives 142 or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, using file system 153 provided by data platform 150, generates objects and other data that file system manager 152 creates, manages, and causes to be stored to storage system 105. For this reason, application system 102 may alternatively be referred to as a "source system," and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 154, system images, directory information, or other types of objects used by application system 102. Objects of different types and objects of a same type may be deduplicated with respect to one another.

Data platform 150 includes archive manager 154 that provides archiving of file system data for file system 153. In the example of system 100, archive manager 154 archives file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 115 may be a storage system deployed and managed a cloud storage provider and referred to as a "cloud storage system." Example cloud storage providers include, e.g., AMAZON WEB SERVICES (AWS) by AMAZON, INC., AZURE by MICROSOFT, INC., DROPBOX by DROPBOX, INC., ORACLE CLOUD by ORACLE, INC., and GOOGLE CLOUD PLATFORM (GCP) by GOOGLE, INC. In some examples, storage system 115 is co-located with storage system 105 in a data center, on-prem, or in a private, public, or hybrid cloud. Storage system 115 may be considered a "backup" or "secondary" storage system for primary storage system 105. Storage system 115 may be referred to as an "external target" for archives 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on primary storage system 105 to support latency sensitive applications. However, because storage system 105 is often more difficult or expensive to scale, data platform 150 may use secondary storage system 115 to support secondary use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include only such data as is needed to restore or view file system 153 in its state at the time of the backup or archive.

Archive manager 154 may archive file system data for file system 153 at any time in accordance with archive policies that specify, for example, archive periodicity and timing (daily, weekly, etc.), which file system data is to be archived, an archive retention period, storage location, access control, and so forth. An initial archive of file system data corresponds to a state of the file system data at an initial archive time (the archive creation time of the initial archive). The initial archive may include a full archive of the file system data or may include less than a full archive of the file system data, in accordance with archive policies. For example, the initial archive may include all objects of file system 153 or one or more selected objects of file system 153.

One or more subsequent incremental archives of the file system 153 may correspond to respective states of the file system 153 at respective subsequent archive creation times, i.e., after the archive creation time corresponding to the initial archive. A subsequent archive may include an incremental archive of file system 153. A subsequent archive may correspond to an incremental archive of one or more objects of file system 153. Some of the file system data for file system 153 stored on storage system 105 at the initial archive creation time may also be stored on storage system 105 at the subsequent archive creation times. A subsequent incremental archive may include data that was not previously archived to storage system 115. File system data that is included in a subsequent archive may be deduplicated by archive manager 154 against file system data that is included in one or more previous archives, including the initial archive, to reduce the amount of storage used. (Reference to a "time" in this disclosure may refer to dates and/or times. Times may be associated with dates. Multiple archives may occur at different times on the same date, for instance.)

In system 100, archive manager 154 archives file system data to storage system 115 as archives 142, using chunkfiles 162. Archive manager 154 may use any of archives 142 to subsequently restore the file system (or portion thereof) to its state at the archive creation time, or the archive may be used to create or present a new file system (or "view") based on the archive, for instance. As noted above, archive manager 154 may deduplicate file system data included in a subsequent archive against file system data that is included in one or more previous archives. For example, a second object of file system 153 and included in a second archive may be deduplicated against a first object of file system 153 and included in a first, earlier archive. Archive manager 154 may replace a data chunk ("chunk") of the second object with a pointer or other reference to a stored chunk of chunks 164 in one of chunkfiles 162. The stored chunk in this example is an instance of a chunk stored for the first object.

Archive manager 154 may apply deduplication as part of a write process of writing (i.e., storing) an object of file system 153 to one of archives 142 in storage system 115. Deduplication may be implemented in various way. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, archive manager 154 can compute chunks having chunk sizes within the range of 16-48 KB. Archive manager 154 may eschew deduplication for objects that that are less than 16 kB. In some example implementations, when data of an object is being considered for deduplication, archive manager 154 compares a chunk identifier (ID) (e.g., a hash value of the entire chunk) of the data to existing chunk IDs for already stored chunks. If a match is found, archive manager 154 updates metadata for the object to point to the matching, already stored chunk. If no matching chunk is found, archive manager 154 writes the data of the object to storage as one of chunks 164 for one of chunkfiles 162. Archive manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of archives 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

Figure 3A:
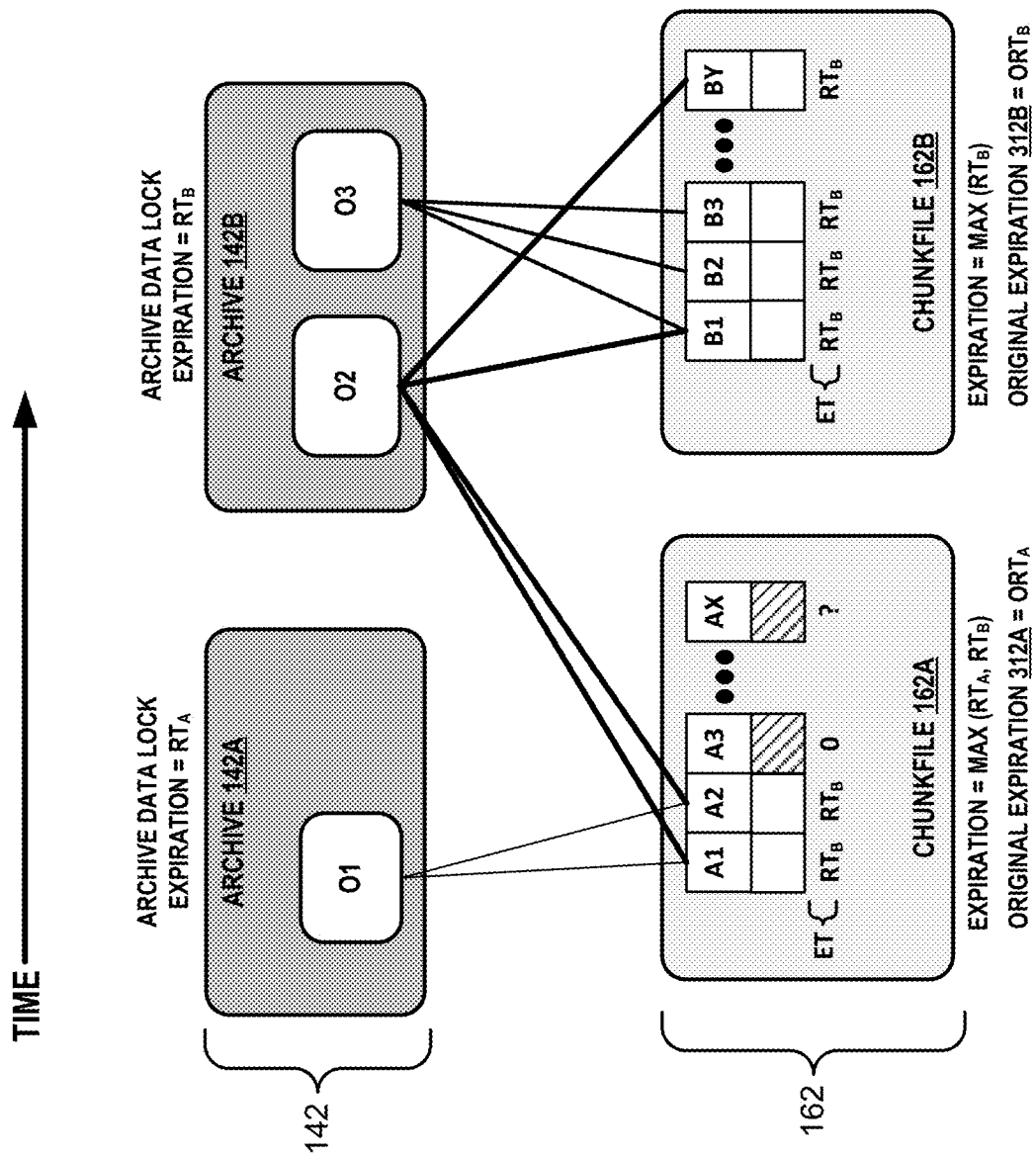
FIGS. 3A-3C are block diagrams illustrating relationships between example objects, archives, and chunkfiles having respective sets of chunks, in accordance with techniques of this disclosure.
Figure 3B:
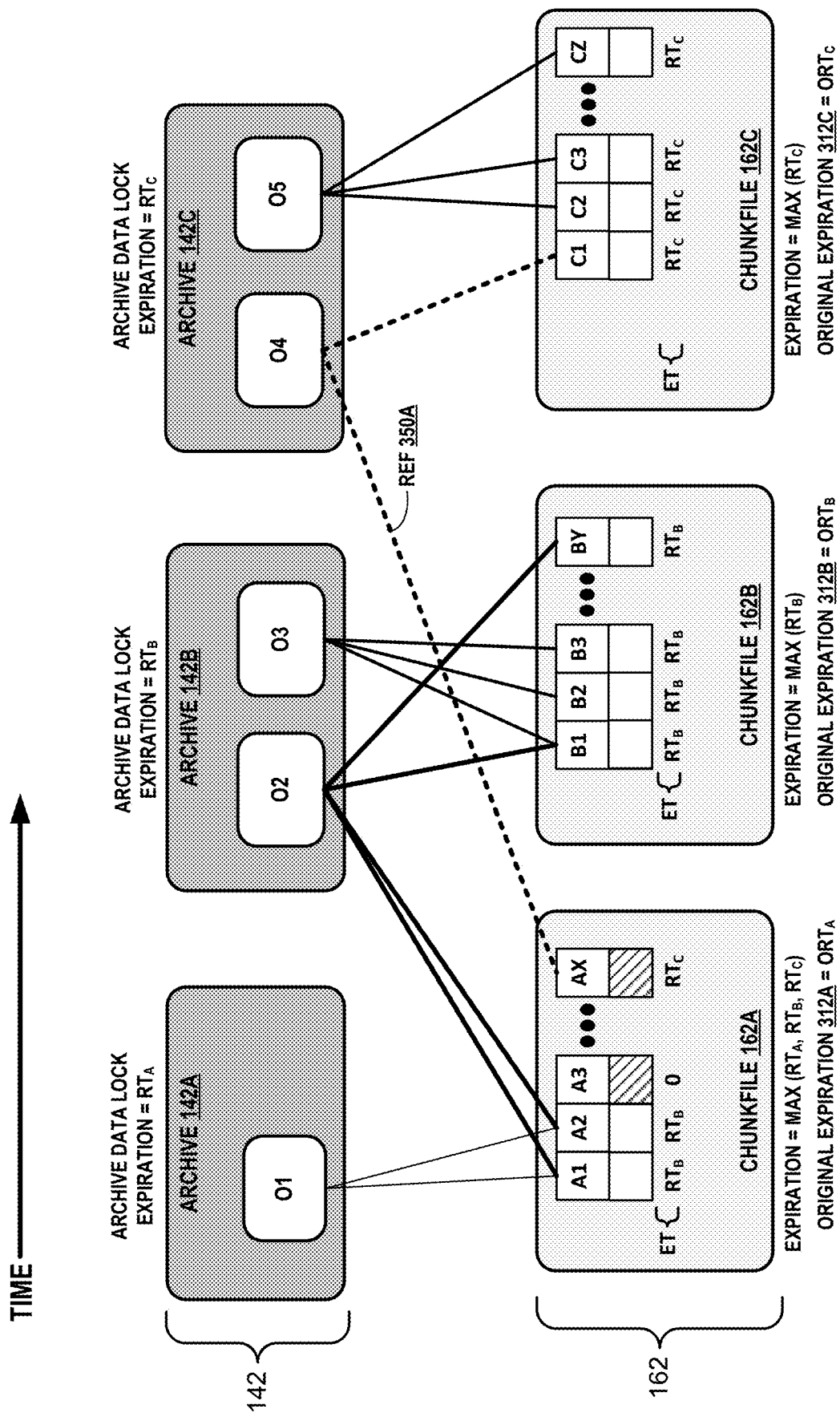
Figure 3C:
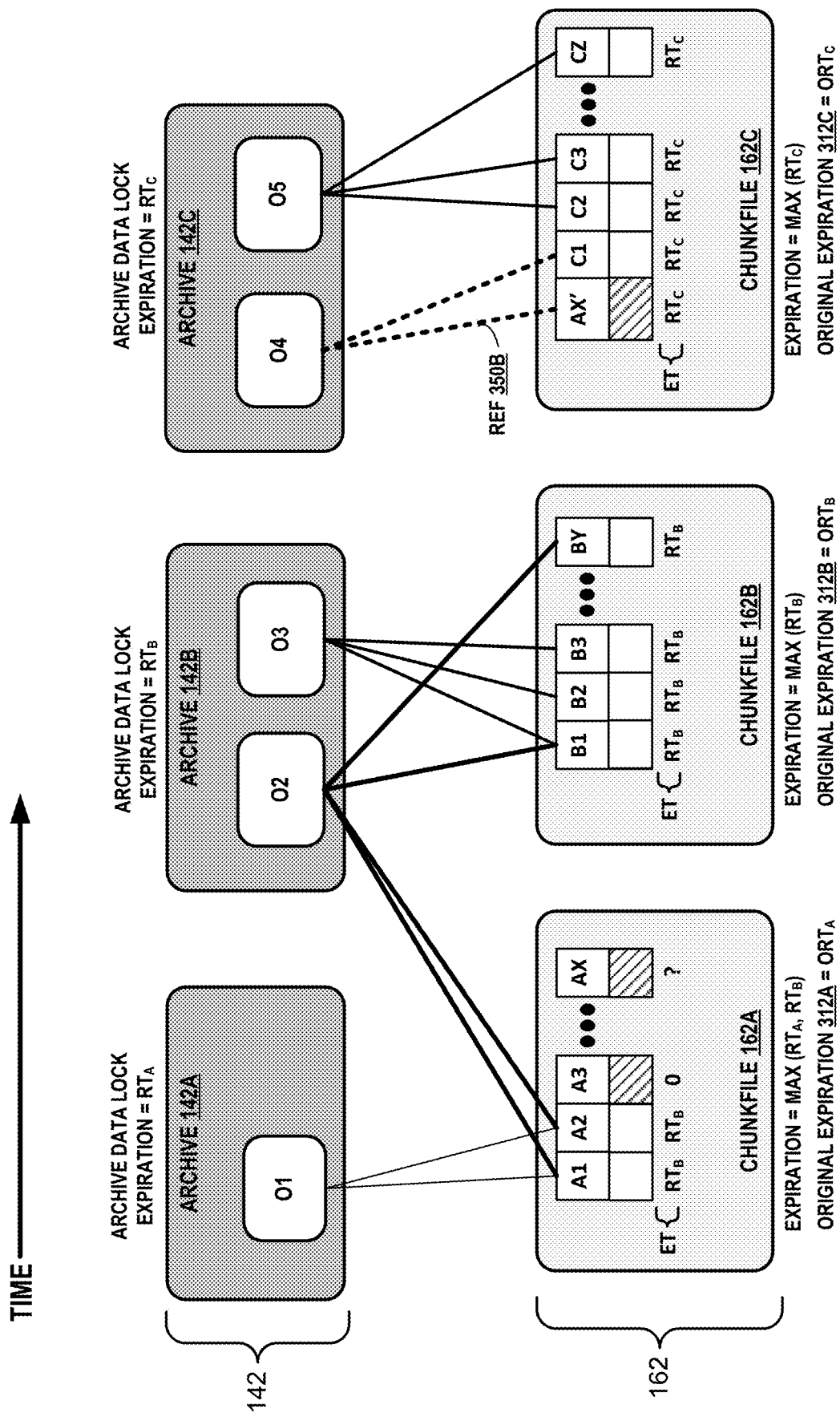

The process of deduplication for multiple objects over multiple archives results in chunkfiles 162 that each have multiple chunks 164 for multiple different objects associated with the multiple archives. FIGS. 3A-3C are block diagrams illustrating relationships between example objects O1-O5, archives 142A-142C, and chunkfiles 162A-162C having respective sets of chunks A1-AX, chunks B1-BY, and chunks C1-CZ (and AX' in FIG. 3C, described further below). (Note that FIG. 3A does not include archive 142C, as explained below.) Data for Object O1 included in archive 142A is stored in chunkfile 162A as (i.e., with references to) chunks A1-A2. (Chunks for an object are not necessarily contiguous in a chunkfile.) Object O1 may be represented using metadata having references to chunks A1-A2 that enable access to some or all of Object O1 using chunks A1-A2. Data for object O2 of archive 142B is stored in chunkfile 162A as chunks A1-A2 (having been deduplicated against A1-A2 earlier stored for Object O1) and is further stored in chunkfile 162B as chunks B1 and BY. Data for object O3 of archive 142B is stored in chunkfile 162B as chunks B1-B3. Data and chunk references for objects O4 and O5, included in archive 142C, are also shown in FIGS. 3B-3C. The process of deduplication for Object O2 when creating archive 142B caused chunks associated with O2 to be spread across multiple chunkfiles 162A and 162B. Chunkfile 162A has chunks A1-A2 that are associated with object O1 of archive 142A and that are also associated with object O2 of archive 142B. Object O2 may be a modified version of Object O1.

In some examples, different archives 142 may have objects that are effectively copies of the same data, e.g., for an object of the file system that has not been modified. An object of an archive may be represented or "stored" as metadata having references to chunks that enable the archived object to be accessed. Accordingly, description herein to an archive "storing," "having," or "including" an object includes instances in which the archive does not store the data for the object in its native form.

The initial archive and the one or more subsequent incremental archives of archives 142 may each be associated with a corresponding retention period and, in some cases, a data lock period for the archive. As described above, a data management policy (not shown) may specify a retention period for an archive and a data lock period for an archive. A retention period for an archive is the amount of time for which the archive and the chunks that objects of the archive reference are to be stored before the archive and the chunks are eligible to be removed from storage. The retention period for the archive begins when the archive is stored (the archive creation time). A chunkfile containing chunks that objects of an archive reference and that are subject to a retention period of the archive, but not subject to a data lock period for the archive, may be modified at any time prior to expiration of the retention period. The nature of such a modification must be such to preserve the data referenced by objects of the archive.

A user or application associated with application system 102 may have access (e.g., read or write) to archived data that is stored in storage system 115. The user or application may delete some of the data due to a malicious attack (e.g., virus, ransomware), a rogue or malicious administrator, or human error. The user's credentials may be compromised and as a result, the archived data that is stored in storage system 115 may be subject to ransomware. To reduce the likelihood of accidental or malicious data deletion or corruption, a data lock having a data lock period may be applied to an archive.

A data lock period for an archive is the minimum amount of time for which file system data associated with an archive is to be locked (e.g., stored in a chunkfile subject to a WORM lock). The data lock period may be associated with a compliance mode or a governance mode. In compliance mode, locked data may not be deleted or modified, by any user, regardless of permissions. In governance mode, locked data may not be deleted or modified, except for one or more users with special privileges. As used herein, reference to a data lock should be understood as preventing data subject to the data lock from being overwritten or deleted during the data lock period, unless the data lock is in governance mode and the user has the required special privileges.

A data lock period for an archive begins at the time the data lock is applied, and the corresponding data lock expiration for the archive is the time at which the data lock period has elapsed. For example, a 1-month data lock period for an archive may begin Jul. 1, 2022, the date at which the data lock is applied to the archive. The corresponding data lock expiration for the archive would be Aug. 1, 2022.

In some examples, although an archive may be subject to a data lock with a data lock period, the data lock is applied to and enforced with respect to chunkfiles 162. In other words, a chunkfile storing chunks referenced by objects of an archive may be subject to a WORM lock to enforce the data lock. A chunkfile that includes chunks for objects associated with multiple archives should have a WORM lock expiration time that is greater than or equal to the maximum of the data lock expiration times for those multiple archives. In this way, the chunks can be protected (i.e., subject to a data lock and not capable of being overwritten or deleted) for any objects associated with the archive that has the data lock period that will end the latest. If this were not the case, chunks for objects associated with one of the multiple archives could be modified, thereby violating the data lock period set for that archive.

In the example of FIG. 3A, if data locks are applied to archive 142A and archive 142B, then the WORM lock expiration for chunkfile 162A should be greater than or equal to the later of the data lock expirations for archive 142A and archive 142B. If this were not the case, chunks A1 or A2 could be deleted or overwritten, object O2 would be corrupted because it references the deleted or overwritten chunk, and the data lock for archive 142B that includes object O2 will have not been properly enforced for its full data lock period.

A data lock expiration time for an archive is, in effect, inherited by all chunks that are referenced by an object associated with the archive. That is, such chunks have a data lock expiration time that is the data lock expiration time of the archive, and such chunks should be WORM-locked until the data lock expiration time. Because objects associated with multiple archives may reference a given chunk, however, the chunk has a data lock expiration time that is the maximum of the respective data lock expiration times of the multiple archives. The data lock expiration time may be specified as an absolute time (e.g., February 1 at 1:00 pm) or as a time-to-live (TTL), for instance. A TTL for an item indicates an amount of time that, once elapsed, means the item is expired. For case of description purposes, the data lock expiration time for a chunk is referred to herein as the chunk expiration time.

To enforce the various data locks for archives having objects that reference chunks in a chunkfile, a WORM lock expiration time for the chunkfile should therefore be greater than or equal to the maximum of the chunk expiration times for all chunks in the chunkfile. As used herein, a chunk expiration time may indicate the time at which the chunk will no longer be referenced by any archive with a data lock and will no longer need to be subject to a WORM lock to enforce a data lock. (Note: because archive retention may exceed the data lock, a chunk that has expired (TTL=0) or was never referenced by an archive subject to a data lock may still be referenced by an archive being retained according to its retention period.) In some cases, however, additional references may be made to a chunk, requiring extending a WORM lock for the chunk.

In the example of FIGS. 3A-3C, for instance, chunks A1 and A2 are referenced by object O1 of archive 142A having archive data lock expiration time $RT_A$ and by object O2 of archive 142B having archive data lock expiration time $RT_B$. (Expiration time is denoted as "ET" in FIGS. 3A-3C.) The chunk expiration times for chunks A1 and A2 should therefore be the maximum of $RT_A$ and $RT_B$, which is $RT_B$ in this case. Chunk A3 is not referenced by any object of any of archives 142A-142C. This non-referenced state is denoted by the hash pattern for chunk A3. Chunk A3 can be deleted (e.g., garbage-collected) at any time without affecting the data integrity of archives 142 and has chunk TTL=0. The maximum expiration times of all chunks of chunkfile 162A is $RT_B$, and the WORM lock expiration time of chunkfile 162A should be greater than or equal to $RT_B$. When a WORM lock expiration time for a chunkfile is reached, the chunkfile may be deleted from storage (e.g., using a garbage-collection process), chunks or chunk metadata of the chunkfile may be modified or deleted, or other changes to the chunkfile may occur.

In view of the above, objects of a file system may be included in different archives but have references to the same stored instance of a chunk, and each of the different archives may have different data lock expiration times. Because an object inherits the data lock of its archive, the various chunks within a chunkfile that are referenced by different objects having different data lock periods may have significantly different respective chunk expiration times. To implement data locks for archives, a chunkfile may be subject to WORM lock having a WORM lock expiration time. The WORM lock expiration time for a chunkfile may be extended where a new archive, subject to a data lock period, includes an object that references a chunk in the chunkfile. The WORM lock expiration time for a chunkfile may be set the latest of the chunk expiration times for its chunks. Once a WORM lock expiration time for a chunkfile is reached, the chunkfile may be garbage collected.

In accordance with techniques of this disclosure, archive manager 154 may apply one or more policies 158 that determine whether to selectively extend a WORM lock expiration time for any of chunkfiles 162. Archive manager 154 may apply policies 158 when deciding whether to add a new reference to an existing chunk in the chunkfile, e.g., to support an object in a new archive for file system 153. A policy of policies 158 may be conditioned on characteristics of the chunkfile. For example, the policy may specify that a WORM lock expiration time for a chunkfile should only be extended if a maximum expiration time based on the original WORM lock expiration time for the chunkfile has not been reached. As another example, the policy may be conditioned on characteristics, e.g., expiration times, of one or more individual chunks within the chunkfile. If conditions in policies 158 for extending a WORM lock expiration time for a chunkfile cannot be satisfied, archive manager 154 may eschew extending the WORM lock expiration time for the chunkfile and instead use a new, different chunkfile—with an appropriate WORM lock expiration time—in chunkfiles 162 being stored to storage system 115, the new chunkfile being used to store a new instance of the chunk for the new reference being added. Archive manager 154 may create a new, different chunkfile to store multiple new instances of different chunks being processed, including the new instance of the chunk. The chunk being considered for deduplication is therefore not being deduplicated in this circumstance because a new instance of the chunk is being stored to a different chunkfile. Archive manager 154 causes this new, different chunkfile to be stored as one of chunkfiles 162 in storage system 105, with an appropriate WORM lock expiration time. If conditions in policies 158 support extending a WORM lock expiration time for the chunkfile, however, archive manager 154 may extend the WORM lock expiration time for the chunkfile and create the new reference to the existing chunk in the chunkfile. In this way, archive manager 154 performs adaptive deduplication of the chunks based on policies 158.

Storage system 115 executes and presents an interface (not shown in FIG. 1A) with which to create, modify, or delete chunkfiles 162. The interface also enables the application of a WORM lock having a WORM lock period to a chunkfile of chunkfiles 162, as well as the extension of the WORM lock period or other extension of the WORM lock expiration time of the chunkfile. (Extending the WORM lock period for a chunkfile has the effect of extending the WORM lock expiration time of the chunkfile.) The interface may be an Application Programming Interface (API).

The techniques may provide one or more technical advantages that realize a practical application. For example, the techniques may improve storage utilization of storage system 115 by chunkfiles 162 by reducing a number of superfluous chunks 164 in storage system 115, i.e., chunks that are not referenced by any archive but that are retained in a chunkfile because the chunkfile remains subject to a WORM lock. For instance, by using a new, different chunkfile instead of extending the WORM lock expiration time of an existing chunkfile, in accordance with policies 158, data platform 150 may garbage-collect the existing chunkfile earlier. This will improve storage utilization of storage system 115 where, for example, the existing chunkfile has many chunks that are not referenced by objects. As another example of the technical advantages, policies 158 provide a flexible and granular mechanism with which to specify whether to extend an expiration time for a chunkfile, allowing the data platform provider and/or user to create policies 158 that best satisfy the sometimes competing goals of the provider/user, such as improving storage utilization of storage system 115, reducing the number of instances of new chunkfiles created (which can correlate to costs relating to uses of a storage system 115 interface or to costs relating to an amount of storage), reducing the number of data locks, reducing the number of chunkfiles 162, and/or other goals.

System 190 of FIG. 1B is a variation of system 100 of FIG. 1A in that data platform 150 stores archives 142 using chunkfiles 162 stored to storage system 105, rather than a separate storage system 115. System 190 may be deployed where the operator of application system 102 relies on on-premises archiving. In the example of system 190, storage system 105 enables users or applications to create, modify, or delete chunkfiles 162. Storage system 105 also enables the application of a WORM lock having a WORM lock period to a chunkfile of chunkfiles 162, as well as the extension of the WORM lock period or other extension of the WORM lock expiration time of the chunkfile. Archive manager 154 may therefore perform adaptive deduplication of chunks based on policies 158, in a manner similar to the techniques described above with respect to system 100 of FIG. 1A. However, chunkfiles 162 are stored to storage system 105 rather than to storage system 115.

Figure 2:
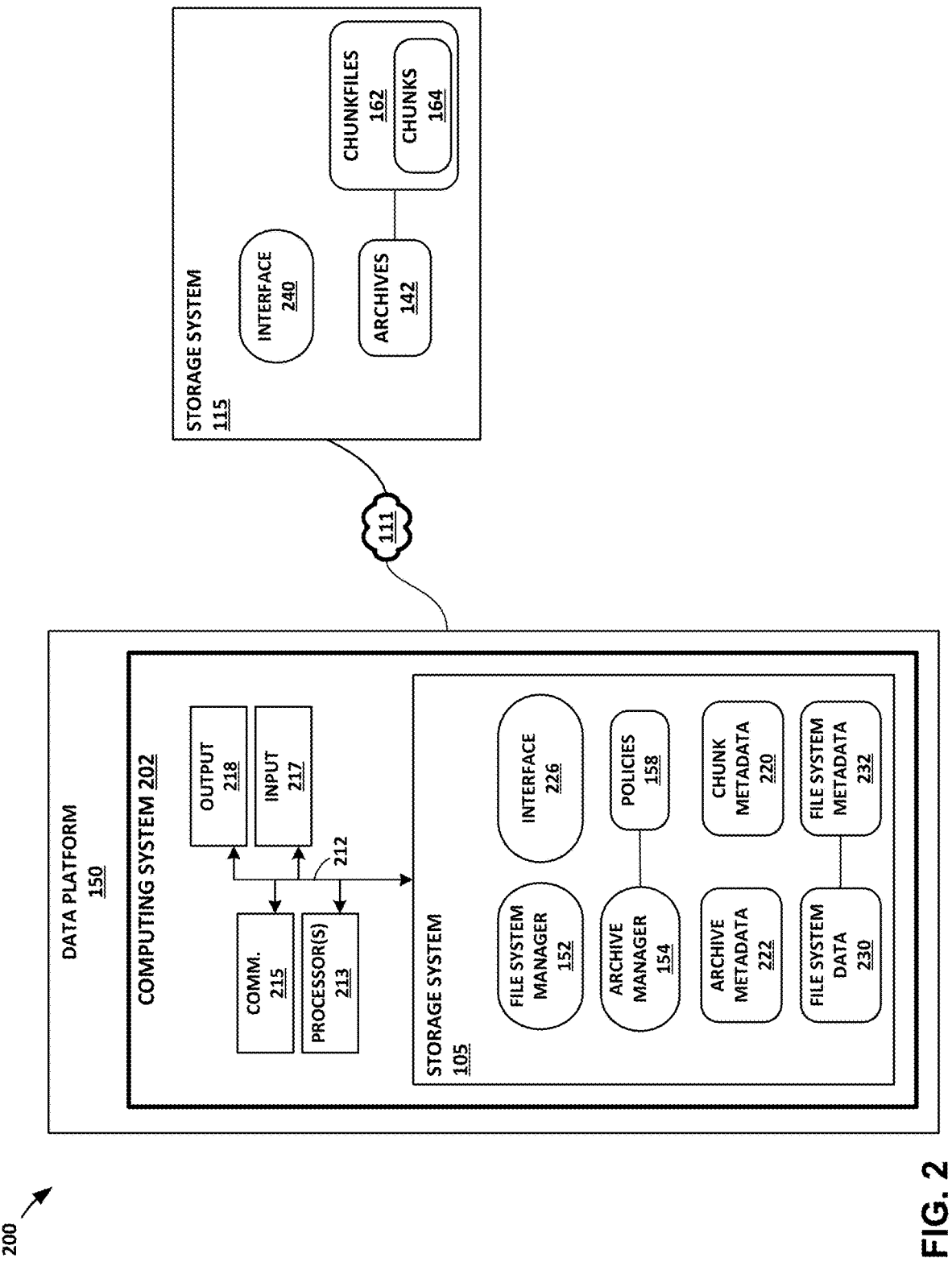
FIG. 2 is a block diagram illustrating example system, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to storage system 105 instead of (or in addition) to storage system 115). One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, data platform 150, and storage system 115 may correspond to network 111, data platform 150, and storage system 115 of FIG. 1A. Although only one storage system 115 is depicted, data platform 150 may apply techniques in accordance with this disclosure using multiple instances of storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of storage system 105. Storage system 105 includes interface module 226, file system manager 152, archive manager 154, policies 158, archive metadata 222, and chunk metadata 220. One or more of the devices, modules, storage areas, or other components of computing system 202 may be interconnected to enable inter-component communications (physically, communicatively, and/or operatively). In some examples, such connectivity may be provided by through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of storage system 105 within computing system 202 may store information for processing during operation of computing system 202. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and storage system 105 may retrieve, store, and/or execute the instructions and/or data of one or more applications, modules, or software. Processors 213 and/or storage devices of storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to storage system 105. File system metadata 232 may include one or more trees that describe objects within file system 153 and the file system 153 hierarchy, and can be used to write or retrieve objects within file system 153. File system metadata 232 may reference any of chunk metadata 220 or archive metadata 222, and vice-versa.

File system manager 152 may interact with and/or operate in conjunction with one or more modules of computing system 202, including interface module 226 and archive manager 154.

Archive manager 154 may perform archive functions relating to archiving file system 153, as described above with respect to FIG. 1A. Archive manager 154 may generate one or more archives 142 and cause file system data 230 to be stored as chunks 164 within chunkfiles 162 in storage system 115. Archive manager 154 may apply an adaptive deduplication process to selectively deduplicate chunks of objects within file system data 230, in accordance with one or more policies 158. Archive manager 154 may generate and manage archive metadata 222 for generating, viewing, retrieving, or restoring any of archives 142. Archive metadata 222 may include respective original data lock periods for archives 142. Archive manager 154 may generate and manage chunk metadata 220 for generating, viewing, retrieving, or restoring objects stored as chunks 164 (and references thereto) within chunkfiles 162, for any of archives 142. Stored objects may be represented and manipulated using logical files for identifying chunks for the objects. Chunk metadata 220 may include a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, archive manager 154 can determine if the data already exists on the system. If the chunks already exist, data can be discarded and metadata for an object updated to reference the existing chunk. Archive manager 154 may use the chunk table to look up the chunkfile identifier for the chunkfile that contains a chunk.

Chunk metadata 220 may include a chunkfile table that describes respective physical or virtual locations of chunkfiles 162 on storage system 115, along with other metadata about the chunkfile, such as a checksum, encryption data, compression data, etc. In FIG. 2, archive manager 152 causes archive metadata 222 and chunk metadata 220 to be stored to storage system 105. In some examples, archive manager 152 causes some or all of archive metadata 222 and chunk metadata 220 to be stored to storage system 115. Archive manager 152, optionally in conjunction with file system manager 152, may use archive metadata 222, chunk metadata 220, and/or file system metadata 232 to restore any of archives 142 to a file system implemented by data platform 150, which may be presented by file system manager 152 to other systems.

Interface module 226 may execute an interface by which other systems or devices may determine operations of file system manager 152 or archive manager 154. Another system or device may communicate via an interface of interface module 226 to specify one or more policies 158.

System 200 may be modified to implement an example of system 190 of FIG. 1B. In the modified system 200, chunkfiles 162 are stored to storage system 105 to support archives 142.

Interface module 240 of storage system may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of a chunkfile).

Figure 4:
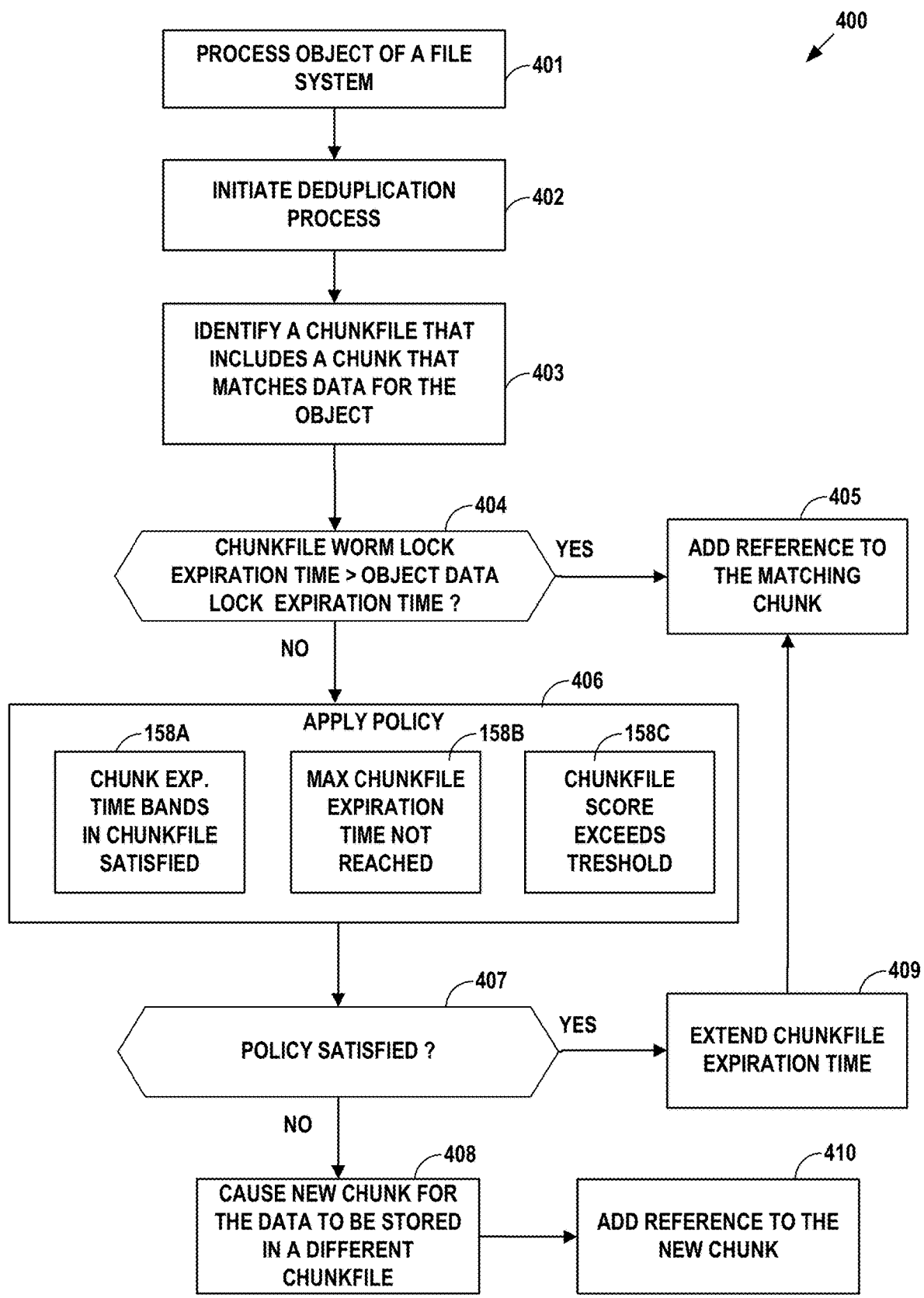
FIG. 4 is a flow chart illustrating an example mode of operation for a data platform to perform adaptive deduplication of file system data, in accordance with techniques of this disclosure.

FIG. 4 is a flow chart illustrating an example mode of operation for a data platform to perform adaptive deduplication of file system data, in accordance with techniques of this disclosure. Mode of operation 400 is described with respect to archive manager 154 and FIGS. 3A-3B.

Starting from the state of the system with archives 142A and 142B (shown in FIG. 3A), as part of generating archive 142C, archive manager 154 obtains and processes object O4 of file system 153 (401). (Note that in some cases, as part of a generating a new archive, archive manager 154 may obtain and process only that portion of an object that has been modified from a previous version of the object or is otherwise not already available as referenceable data chunks stored to one of chunkfiles 162. Reference herein to obtaining and processing, or otherwise operating with respect to an object should be understood as in some cases operating with respect to all or less than all of the data for the object and should further be understood as operating in some cases, in addition or alternatively, with respect to metadata that describes or is usable for accessing data for the object.) As part of processing object O4 for archiving, archive manager 154 initiates deduplication for data of object O4 (402). Processing object O4 involves writing data for object O4 to a storage system and/or creating references to existing stored chunks for data of object O4 that is be deduplicated.

For a segment of data of the object, archive manager 154 identifies chunkfile 162A that includes a matching chunk AX for the data of the object (403). Archive manager 154 may identify the chunkfile using chunk metadata 220 and a hash computed for the data of the object. As an initial step, archive manager 154 determines whether a WORM lock expiration time for chunkfile 162A is greater than a data lock expiration time for object O4 (which may be based on a data lock period for archive 142C. If greater (YES block of 404), then object O4 will be eligible for deletion (e.g., for garbage-collection) before chunkfile 162A is deleted, there is no drawback to deduplicating the data for the object against chunk AX, and archive manager 154 therefore adds a reference 350A for data of the object to chunk AX (405), as shown in FIG. 3B. If not greater, however (NO block of 404), archive manager 154 may determine whether to perform deduplication for the data of the object by applying policies 158 to one or more of the data for the object, chunkfile 162A, or one or more the chunks included in chunkfile 162A (406). Step 404 is an optional step and not performed by all example instances of archive manager 154.

Policies 158 may be configurable by a user or application. Policies 158 may be conditioned on many different properties of data and metadata in the system. Example policies 158 are shown in FIG. 4. Policy 158A is conditioned on properties of the chunks in a chunkfile. Specifically in this case, policy 158A is conditioned on chunk expiration times of the chunks. A background process or task for archive manager 154 may process chunkfiles 162 to compute metadata that indicates chunk expiration times for chunks 164. Chunks 164 of chunkfile 162A have varying chunk expiration times, for example. Chunks 164 of a chunkfile 162 may be grouped into multiple expiration time bands according to chunk expiration time, and the proportions of chunks included in the expiration time bands can determine whether an expiration time for the chunk should be extended beyond its current expiration time. For example, a set of expiration time bands may be:

(Band A) Expiration in less than 30 days
(Band B) Expiration between 30 days and 6 months
(Band C) Expiration greater than 6 months For an example WORM-locked chunkfile having a data lock expiration time of 2 years:

80% of the chunks are in Band A
10% of the chunks are in Band B
10% of the chunks are in Band C Thresholds for the expiration time bands proportions, and the expiration time bands time ranges, may be set in a policy. For the above example chunkfile, the policy should be set to not extend an expiration time because the chunkfile should be garbage-collected soon due to the large percentage of chunks expiring within 30 days.

For a different WORM-locked chunkfile having a data lock expiration time of 2 years:

10% of the chunks are in Band A
10% of the chunks are in Band B
80% of the chunks are in Band C For this example chunkfile, the policy should be set to extend an expiration time because most of the chunks of the chunkfile will not expire for at least 6 months and can be used for additional references.

In some examples, the background task of archive manager 154 may compute the chunk expiration times for a chunkfile, group the chunks into the multiple time bands according to chunk expiration time (the time bands specified by a policy), and apply thresholds to the proportions of chunks of the expiration time bands to determine the outcome of the policy for the chunkfile. The background task may generate metadata indicating the chunkfile as eligible or ineligible for extending its expiration time according to the outcome of the policy. In such cases, applying policy 158A involves simply determining whether the metadata indicates whether the chunkfile is eligible or ineligible for extending its expiration time. If eligible, policy 158A is satisfied.

As another example, policy 158B is conditioned on a maximum expiration time for the chunkfile. As part of creating chunkfiles 162A-162C, archive manager 154 stores metadata indicating original expiration times 312A-312C (collectively, "original expiration times 312") that are respective properties of respective chunkfiles 162A-162C. An original expiration time may be a function of the chunkfile creation or storage time and/or a data lock period for the chunkfile. Policy 158B limits extending the WORM lock expiration time for a chunkfile beyond a maximum WORM lock expiration time, e.g., for the purpose of adding a reference to the chunkfile. Policy 158B may have a configurable maximum expiration period. Archive manager 154 applying policy 158B may determine whether the maximum WORM lock expiration time for chunkfile 162A would be reached by the amount of extension time needed to safely add a reference to chunk AX for the data for the object O4 (e.g., if extending a WORM lock expiration time for chunkfile 162A from its current WORM lock expiration time would exceed original WORM lock expiration time 312A plus the maximum expiration period).

In some examples, as part of creating chunkfiles 162, archive manager 154 stores metadata indicating creation or storage times of chunkfiles 162 rather than original WORM lock expiration times. Policy 158B may then have a configurable maximum expiration period with which to determine the maximum WORM lock expiration times for chunkfiles 162 as a function of the original WORM lock expiration times, e.g., their sum.

If application of policy 158B indicates the maximum WORM lock expiration period would not be reached, policy 158B is satisfied. Otherwise, policy 158B is not satisfied.

As another example, policy 158C is conditioned on an overall "score" for a chunkfile 162 being considered. The score for a chunkfile 162 may be a function of properties of its chunks 164. An example property of chunks 164 may be a number of references to a chunk. A larger number of references increases the likely value of the chunk for future deduplication, i.e., writes of new data will be relatively likely to reference the chunk compared to other chunks with fewer references. A background process or task for archive manager 154 may process chunkfiles 162 and chunk metadata 220 to compute additional chunk metadata 220 that indicates a number of references to each chunk. Another example property of chunks 164 may be a referenced time that indicates a time at which a chunk was last referenced. Archive manager 154 may create and store referenced time for a chunk as chunk metadata 220. A more recent referenced time increase the likely value of the chunk for future deduplication, i.e., the chunk is not stale. Other properties of chunks or of a chunkfile may be used to condition policies 158, whether or not specifically described in this disclosure.

In some examples, chunks 164 of a chunkfile 162 may be grouped into multiple number of references bands according to the number of references to the chunks, and the proportions of chunks included in the number of references bands can determine whether an expiration time for the chunk should be extended beyond its current expiration time. For example, a set of number of references bands may be:

(Band A) Number of references less than 3
(Band B) Number of references between 4 and 9
(Band C) Number of references greater than 10

For a WORM-locked chunkfile,

80% of the chunks are in Band A
10% of the chunks are in Band B
10% of the chunks are in Band C Thresholds for the number of references bands proportions, and the number of references ranges, may be set in a policy. For the above example chunkfile, the policy should be set to not extend an expiration time because the chunkfile is relatively "cold" (few references) and relatively less likely to have many additional references added. Its chunks should be allowed to expire relatively sooner rather than later.

For a different WORM-locked chunkfile:
10% of the chunks are in Band A
10% of the chunks are in Band B
80% of the chunks are in Band C For this example chunkfile, the policy should be set to extend an expiration time because the chunkfile is relatively "hot" (many references) and relatively more likely to have many additional references added. Its chunks' expiration times should be increased by extending the WORM lock expiration time of the chunkfile so as to continue utilizing the chunks for deduplication.

In some examples, the background task of archive manager 154 may compute the number of references for chunks 164 for a chunkfile, group the chunks 164 into the multiple number of references bands according to chunk expiration time (the time bands specified by a policy), and apply thresholds to the proportions of chunks of the number of references bands to determine the outcome of the policy for the chunkfile. The background task may generate metadata indicating the chunkfile as eligible or ineligible for extending its expiration time according to the outcome of the policy. In such cases, applying policy 158C involves simply determining whether the metadata indicates whether the chunkfile is eligible or ineligible for extending its expiration time. If eligible, policy 158C is satisfied. In some cases, the background task may generate metadata comprising a score (e.g., a number) indicating the relative value of the chunkfile for future deduplication. The score may be computed as a function of the number of references of the chunks and may be based on the proportions of chunks of the number of references bands. Policy 158C may specify a threshold against the score whereby if the threshold is met by the score, policy 158C is satisfied.

In some examples, chunks 164 of a chunkfile 162 may be grouped into multiple last reference bands according to the last referenced times of the chunks, and the proportions of chunks included in the last reference bands can determine whether a WORM lock expiration time for the chunkfile should be extended beyond its current expiration time. For example, a set of number of last reference bands may be:
(Band A) Last reference less than 1 week ago
(Band B) Last reference between 1 week and 1 month ago
(Band C) Last reference more than 1 month ago
For a WORM-locked chunkfile,
10% of the chunks are in Band A
10% of the chunks are in Band B
80% of the chunks are in Band C Thresholds for the last reference bands proportions, and the referenced times ranges, may be set in a policy. For the above example chunkfile, the policy should be set to not extend an expiration time because the chunkfile is relatively "cold" (for the most part, references have not been added recently) and relatively less likely to have many additional references added in the near future. Its chunks should be allowed to expire relatively sooner rather than later.

For a different WORM-locked chunkfile:
80% of the chunks are in Band A
10% of the chunks are in Band B
10% of the chunks are in Band C For this example chunkfile, the policy should be set to extend a WORM lock expiration time because the chunkfile is relatively "hot" (for the most part, references have been added recently) and relatively more likely to have many additional references added in the near future. Its chunks' expiration times should be increased by extending the WORM lock expiration time of the chunkfile so as to continue utilizing the chunks for deduplication.

In some examples, the background task of archive manager 154 may group the chunks 164 into the multiple last reference bands according to chunks' respective referenced times (the last reference bands specified by a policy), and apply thresholds to the proportions of chunks of the last reference bands to determine the outcome of the policy for the chunkfile. The background task may generate metadata indicating the chunkfile as eligible or ineligible for extending its WORM lock expiration time according to the outcome of the policy. In such cases, applying policy 158C involves simply determining whether the metadata indicates whether the chunkfile is eligible or ineligible for extending its WORM lock expiration time. If eligible, policy 158C is satisfied. In some cases, the background task may generate metadata comprising a score (e.g., a number) indicating the relative value of the chunkfile for future deduplication. The score may be computed as a function of the respective referenced times of the chunks and may be based on the proportions of chunks of the last reference bands. Policy 158C may specify a threshold against the score whereby if the threshold is met by the score, policy 158C is satisfied.

Multiple policies 158 can be applied. In some examples, in order to deduplicate (YES branch of 407), all of the multiple applied policies must be satisfied. In some examples, in order to deduplicate (YES branch of 407), at least one of the multiple applied policies must be satisfied.

Continuing with mode of operation 400, if the one or more policies 158 are satisfied (YES branch of 407), archive manager 154 determines to perform the deduplication and extends the WORM lock expiration time of chunkfile 300A (409). The amount of time extension may be specified by policies 158 and may vary according to conditions of a policy. The amount of time extension may be a function of the amount of time extension specified by each of one or more policies 158 that are satisfied at step 406. The amount of time extension should account for the data lock period for the new archive, however. Thus, in the illustrated example, as a result of adding the reference 350A in the example of FIG. 3B, the TTL for AX is $RT_C$, and the WORM lock expiration time for chunkfile 162A is the maximum of $RT_A$, $RT_B$, and $RT_C$. To extend the WORM lock expiration time, archive manager 154 may invoke a method of interface 240 of storage system 115 to specify a new WORM lock expiration time for chunkfile 300A. Archive manager 154 adds a reference 350A for the data of the object to chunk AX (405), again as shown in FIG. 3B.

If the one or more policies 158 are not satisfied (NO branch of 407), then archive manager 154 uses a new, different chunkfile 162C to store chunk AX' as a new chunk for the data of object O4 (408) and adds reference 350B to chunk AX' for the data of object O4 (410), as shown in FIG. 3C.

Figure 5:
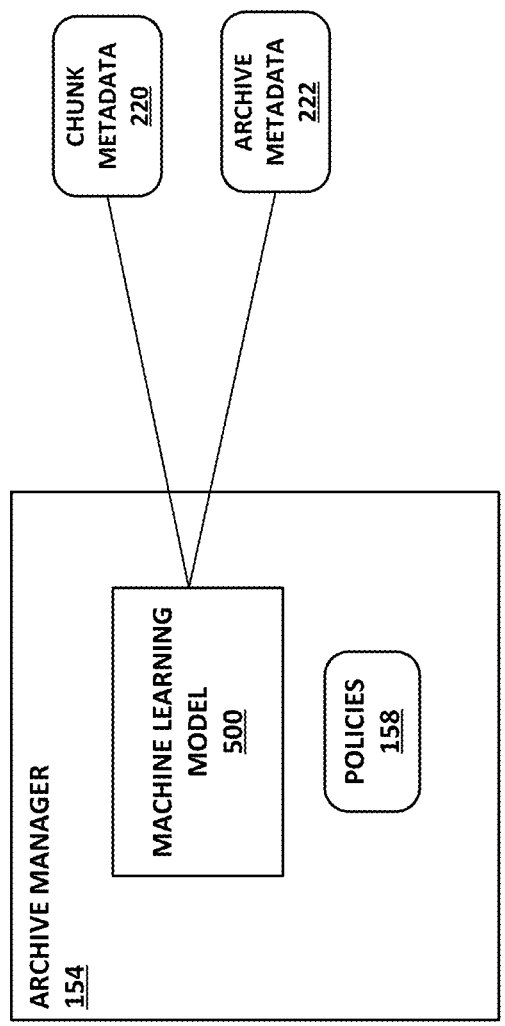
FIG. 5 is a block diagram illustrating an example instance of an archive manager that performs adaptive deduplication of data chunks, in accordance with one or more aspects of the present disclosure.

FIG. 5 is a block diagram illustrating an example of archive manager 154 in further detail. In FIG. 5, archive manager 154 includes machine learning (ML) model 500 trained to generate policies 158 by predicting whether a WORM lock expiration time for a chunkfile should be extended for various conditions described elsewhere in this disclosure, where such conditions may be based on a property of the chunkfile or to properties of one or more of a plurality of chunks included in the chunkfile. For example, ML model 500 may determine any of the various types of "bands" described above for policy 158C and generate a formula for computing a score for the chunk based on the proportion of chunks in the bands. In some cases, ML model

500 may be applied directly to a property of the chunkfile or to properties of one or more of a plurality of chunks included in the chunkfile to predict a score for the chunkfile or to approve extending the WORM lock expiration time (effectively replacing steps 406 and 407 of operation 400). However, while applying a ML model 500 directly to a property of the chunkfile or to properties of one or more of a plurality of chunks included in the chunkfile to predict a score for the chunkfile or to approve extending the WORM lock expiration time would improve the decision-making over a policy-based scheme, the latency involved may militate toward using ML model 500 to generate policies 158 for direct application by archive manager 154.

A machine learning system separate from data platform 150 may be used to train ML model 500. The machine learning system may be executed by a computing system having hardware components similar to those described with respect to computing system 202. ML model 500 may include one or more neural networks, such as one or more of a Deep Neural Network (DNN) model, Recurrent Neural Network (RNN) model, and/or a Long Short-Term Memory (LSTM) model. In general, DNNs and RNNs learn from data available as feature vectors, and LSTMs learn from sequential data.

The machine learning system may apply other types of machine learning to train ML model 500. For example, the machine learning system may apply one or more of nearest neighbor, naïve Bayes, decision trees, linear regression, support vector machines, neural networks, k-Means clustering, Q-learning, temporal difference, deep adversarial networks, or other supervised, unsupervised, semi-supervised, or reinforcement learning algorithms to train ML model 500.

ML model 500 processes training data for training ML model 500, data for prediction, or other data. Training data may include any one or more of archive metadata 222, chunk metadata 220, file system data 230, or file system metadata 232, with instances of each captured at different times and therefore usable to train on the changing state of data platform 150 and, in particular, the utilization of different chunkfiles 162. ML model 500 may in this way be trained to identify patterns in the properties of the chunkfiles and properties of chunks included in the chunkfiles that tend to affect storage utilization of a chunkfile over time, a number of calls to interface 240, or other factor that affects the decision of whether to deduplicate a given data for an object against an existing chunk.

Although the techniques described in this disclosure are primarily described with respect to an archive function performed by an archive manager of a data platform, similar techniques may additionally or alternatively be applied for a backup, replica, clone, or snapshot functions performed by the data platform. In such cases, archives 142 would be backups, replicas, clones, or snapshots, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
    identifying, by a data platform implemented by a computing system, a first chunkfile that includes a chunk that matches data for an object of a file system;
    computing, by the data platform, properties of one or more of a plurality of chunks included in the first chunkfile, the properties being one or more of:
        a number of the chunks, included in the first chunkfile, having chunk expiration times in each of two or more expiration time bands each having a range of expiration times,
        respective numbers of references for the chunks included in the first chunkfile, or
        respective last referenced times for the chunks included in the first chunkfile;
    determining, by the data platform after identifying the first chunkfile, whether to deduplicate the data for the object of the file system by adding a reference to the matching chunk, wherein determining whether to deduplicate the data for the object of the file system comprises applying a policy to the properties of the one or more of the plurality of chunks included in the first chunkfile to determine whether a write one, read many (WORM) lock expiration time for the first chunkfile can be extended according to the policy; and
    in response to determining the WORM lock expiration time for the first chunkfile can be extended according to the policy, deduplicating the data for the object of the file system by adding the reference to the matching chunk.

2. The method of claim 1, further comprising:
    in response to determining the WORM lock expiration time for the first chunkfile cannot be extended according to the policy, causing a new chunk for the data for the object of the file system to be stored in a different, second chunkfile.

3. The method of claim 1, wherein applying the policy comprises applying the policy to the WORM lock expiration time of the first chunkfile, the method further comprising:
    in response to determining the WORM lock expiration time for the first chunkfile can be extended according to the policy, extending the WORM lock expiration time of the first chunkfile.

4. The method of claim 1, further comprising:
    computing a data lock expiration time for the data for the object of the file system; and
    deduplicating the data for the object of the file system by adding the reference to the matching chunk when the WORM lock expiration time for the first chunkfile is greater than the data lock expiration time for the data for the object of the file system.

5. The method of claim 1, wherein the first chunkfile is stored to a storage system of a cloud storage provider.

6. The method of claim 1, further comprising:
    initiating generation of a new backup or archive for the file system; and
    processing the object of the file system to obtain the data for the object of the file system as part of the generation of the new backup or archive.

7. The method of claim 1, wherein the matching chunk of the first chunkfile is associated with an existing archive or backup of the file system, the method further comprising:
    processing the object of the file system to generate a new archive or a new backup of the file system.

8. The method of claim 1, wherein applying the policy comprises:
    obtaining metadata indicative of an original WORM lock expiration time for the first chunkfile, and
    applying the policy to the metadata to determine whether the WORM lock expiration time for the first chunkfile can be extended according to the policy.

9. The method of claim 1, further comprising:
    computing, by the data platform, respective chunk expiration times for the chunks included in the first chunkfile,
    wherein applying the policy comprises applying the policy to the chunk expiration times to determine whether the WORM lock expiration time for the first chunkfile can be extended according to the policy; and
    determining to deduplicate the data for the object of the file system when the WORM lock expiration time for the first chunkfile can be extended according to the policy.

10. The method of claim 1, wherein the policy specifies the two or more expiration time bands, the method further comprising:
    computing the number of the chunks, included in the first chunkfile, having chunk expiration times in each of the two or more expiration time bands; and
    determining the WORM lock expiration time for the first chunkfile can be extended according to the policy based on respective proportions of those chunks having a chunk expiration time in the two or more expiration time bands.

11. The method of claim 1, further comprising:
    computing, by the data platform, the respective numbers of references for the chunks included in the first chunkfile,
    wherein applying the policy comprises applying the policy to the respective numbers of references for the chunks to determine whether the WORM lock expiration time for the first chunkfile can be extended according to the policy; and determining to deduplicate the data for the object of the file system when the WORM lock expiration time for the first chunkfile can be extended according to the policy.

12. The method of claim 11, wherein the policy specifies two or more number of references bands each having a range of numbers of references, the method further comprising:
computing a number of the chunks, included in the first chunkfile, having respective numbers of references in each of the number of references bands; and
determining the WORM lock expiration time for the first chunkfile can be extended according to the policy based on respective proportions of those chunks having a number of references in the number of references bands.

13. The method of claim 1, further comprising:
computing, by the data platform, the respective last referenced times for the chunks included in the first chunkfile,
wherein applying the policy comprises applying the policy to the respective last referenced times for the chunks to determine whether the WORM lock expiration time for the first chunkfile can be extended according to the policy; and
determining to deduplicate the data for the object of the file system when the WORM lock expiration time for the first chunkfile can be extended according to the policy.

14. The method of claim 13, wherein the policy specifies two or more last referenced bands each having a range of last referenced times, the method further comprising:
computing a number of the chunks, included in the first chunkfile, having respective last referenced times in each of the last referenced bands; and
determining the WORM lock expiration time for the first chunkfile can be extended according to the policy based on respective proportions of those chunks having last referenced times in the last referenced bands.

15. The method of claim 1, wherein applying the policy comprises determining whether metadata for the chunk, the metadata generated based on the policy, indicates whether the WORM lock expiration time for the first chunkfile can be extended according to the policy,
the method further comprising determining to deduplicate the data for the object of the file system when the metadata for the chunk indicates the WORM lock expiration time for the first chunkfile can be extended according to the policy.

16. A computing system comprising:
a storage device; and
processing circuitry having access to the storage device and configured to:
identify a first chunkfile that includes a chunk that matches data for an object of a file system;
compute properties of one or more of a plurality of chunks included in the first chunkfile, the properties being one or more of:
a number of the chunks, included in the first chunkfile, having chunk expiration times in each of two or more expiration time bands each having a range of expiration times,
respective numbers of references for the chunks included in the first chunkfile, or
respective last referenced times for the chunks included in the first chunkfile;
determine, after identifying the first chunkfile, whether to deduplicate the data for the object of the file system by adding a reference to the matching chunk, wherein determining whether to deduplicate the data for the object of the file system comprises applying a policy to the properties of the one or more of the plurality of chunks included in the first chunkfile to determine whether a write one, read many (WORM) lock expiration time for the first chunkfile can be extended according to the policy; and
in response to a determination the WORM lock expiration time for the first chunkfile can be extended according to the policy, deduplicate the data for the object of the file system by adding the reference to the matching chunk.

17. The computing system of claim 16, wherein the processing circuitry is further configured to:
in response to a determination the WORM lock expiration time for the first chunkfile cannot be extended according to the policy, causing a new chunk for the data for the object of the file system to be stored in a different, second chunkfile.

18. The computing system of claim 16, wherein:
to apply the policy, the processing circuitry is further configured to apply the policy to the WORM lock expiration time of the first chunkfile; and
the processing circuitry is further configured to, in response to a determination the WORM lock expiration time for the first chunkfile can be extended according to the policy, extend the WORM lock expiration time of the first chunkfile.

19. The computing system of claim 16, wherein the processing circuitry is further configured to:
initiate generation of a new backup or archive for the file system; and
process the object of the file system to obtain the data for the object of the file system as part of generating the new backup or archive.

20. A computer-readable storage medium comprising instructions that, when executed, configure processing circuitry of a computing system to:
identify a first chunkfile that includes a chunk that matches data for an object of a file system;
compute properties of one or more of a plurality of chunks included in the first chunkfile, the properties being one or more of:
a number of the chunks, included in the first chunkfile, having chunk expiration times in each of two or more expiration time bands each having a range of expiration times,
respective numbers of references for the chunks included in the first chunkfile, or
respective last referenced times for the chunks included in the first chunkfile;
determine whether to deduplicate the data for the object of the file system by adding a reference to the matching chunk, wherein determining whether to deduplicate the data for the object of the file system comprises applying a policy to the properties of the one or more of the plurality of chunks included in the first chunkfile to determine whether a write one, read many (WORM) lock expiration time for the first chunkfile can be extended according to the policy; and
in response to a determination the WORM lock expiration time for the first chunkfile can be extended according to the policy, deduplicate the data for the object of the file system by adding the reference to the matching chunk.

* * * * *